United States Patent Office 3,759,746
Patented Sept. 18, 1973

3,759,746
POROUS ELECTRODE COMPRISING A BONDED STACK OF PIECES OF CORRUGATED METAL FOIL
John McCallum, Worthington, Ohio, assignor to the United States of America as represented by the Administrator of the National Aeronautics and Space Administration
Filed Mar. 22, 1972, Ser. No. 237,029
Int. Cl. H01m 35/04
U.S. Cl. 136—24                           16 Claims

ABSTRACT OF THE DISCLOSURE

An electrode suitable for use in an electrochemical cell, comprising a porous conductive support comprising a bonded stack of pieces of thin corrugated nickel foil wherein the corrugations are oriented approximately perpendicular to the sides of the electrode and form an array of passages through the electrode, and active material such as cadmium hydroxide or nickel hydroxide substantially uniformly distributed within the passages. The support may comprise also a piece of thin flat nickel foil between adjacent pieces of the corrugated foil, forming a barrier between the passages formed on each side of it. Typically the corrugations in the odd corrugated layers are oriented at a small angle from the perpendicular in one direction and the corrugations in the even corrugated layers are oriented at a small angle from the perpendicular in the opposite direction.

---

The invention described herein was made in the performance of work under a NASA contract and is subject to the provisions of Section 305 of the National Aeronautics and Space Act of 1958, Public Law 85–568 (72 Stat. 435; 42 U.S.C. 2457).

CROSS-REFERENCE TO RELATED APPLICATION

Presently preferred methods for making supports in the electrodes of the present invention are disclosed and claimed in the United States patent application of Glenn R. Schaer, Ser. No. 236,985, filed Mar. 22, 1972 (the same filing date as that of the present application).

BACKGROUND OF THE INVENTION

In conventional sintered nickel plaques used as supports in nickel cadmium and nickel zinc batteries the pores are not uniform in size or in shape and they are interconnected in a random manner. Because of this randomness the active material used in the battery electrodes made from such supports cannot be uniformly coated throughout with active material. Some of the smaller pores may be completely filled with active material and thus are of little or no use. In other areas of the electrode the active material may move from one pore to another as the battery is charged and discharged so that the distribution of the active material changes with time. Thus such electrodes are rather inefficient and can cause the batteries in which they are used to fail much sooner than they should.

The performance of porous electrodes in batteries and other electrochemical cells can be greatly improved if the supports for the active material have pores of uniform size extending completely through the electrode from one side to the other and with no interconnections between the pores. The present invention provides such supports wherein the pores are uniform in size, are not interconnected, and extend from one side of the electrode to the other to provide easy access for current to reach all of the electrochemically active material deposited in the pores. Thus the active material is used to its fullest capabilities and the capacity of the electrode is not reduced by any migration of material from one pore to another. Also higher discharge and charge rates can be used for the same size of electrode because of the direct connection of each pore to the side surfaces of the electrode and from there to any counterelectrodes in the cell or battery.

SUMMARY OF THE INVENTION

A typical electrode according to the present invention suitable for use in an electrochemical cell comprises a porous conductive support comprising a bonded stack of pieces of thin corrugated metal foil wherein the corrugations are oriented approximately perpendicular to the sides of the electrode and form an array of passages through the electrode, and active material substantially uniformly disrtibuted within the passages. Typically the support comprises also a piece of thin flat metal foil between adjacent pieces of the corrugated foil, with each flat metal foil forming a barrier between the passages formed on each side of it; and the adjacent pieces of foil preferably are bonded at substantially all contiguous points so that each passage is isolated from every other passage.

The corrugations in alternate corrugated layers typically are oriented in approximately the same direction, with the corrugations in the odd corrugated layers oriented at a small angle from the perpendicular in one direction and the corrugations in the even corrugated layers oriented at a small angle from the perpendicular in the opposite direction.

Where the support is made of inert conductive material, the electrode is rechargeable. Typically the inert material consists essentially of nickel, and the active material consists essentially of cadmium hydroxide or nickel hydroxide.

The corrugated foil typically is about 0.3 to 1 mil thick and the flat foil about 0.2 to 1 mil thick. The corrugations typically are substantially triangular in cross section, with each corrugation about 2 to 6 mils high and 2 to 10 mils wide and with the height of each corrugation at least about one-half its width. The density of the support preferably is less than about 25 percent, and the density of the electrode preferably is less than about 55 percent.

The invention includes also an electrochemical cell comprising an electrode as summarized above and means for maintaining the electrode in an upright position with the pieces of corrugated foil therein positioned in substantially horizontal planes.

The figures are highly magnified and not to scale.

For simplicity and clarity, the active material 21, which actually is distributed uniformly over all surfaces of the corrugations except the ends, is shown on only a small portion of the electrode in each figure.

DESCRIPTION OF THE PREFERRED EMBODIMENTS

Figure 1:
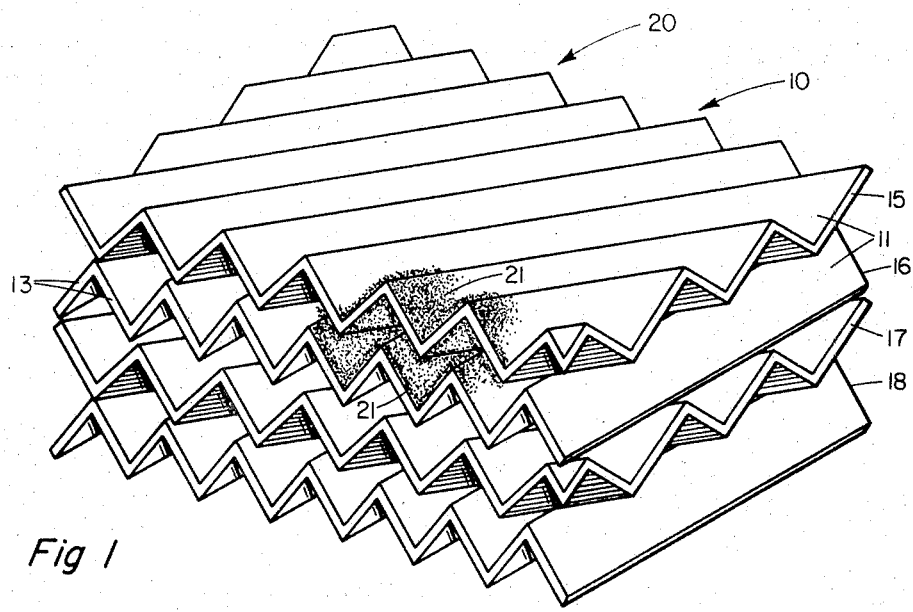
FIG. 1 is a perspective view of a portion of a typical electrode according to the present invention.
Figure 2:
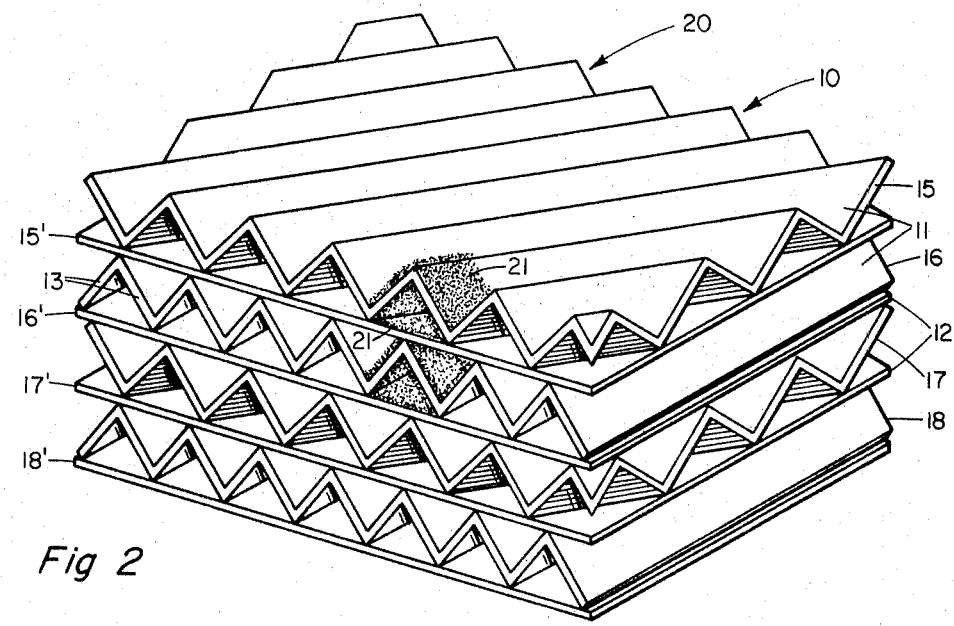
FIG. 2 is a similar view of a portion of another such electrode.

A typical eletrode 20 according to the present invention suitable for use in an electrochemical cell, comprises a porous conductive support 10 comprising a bonded stack of pieces 11 of thin corrugated metal foil wherein the corrugations 13 are oriented approximately perpendicular to the sides of the electrode (i.e., the plane faces formed by the edges at the lower left and upper right in FIGS. 1 and 2) and form an array of passage through the electrode, and active material 21 substantially uniformly distributed within the passages (as shown for clarity in only a portion of the surfaces in the drawings). Typically the support comprises also a piece 12 of thin flat metal foil between adjacent pieces 11 of the corrugated foil, as in FIG. 2, with each flat metal foil 12 forming a barrier between the pasages formed on each side of it.

The corrugations in alternate corrugated layers typically are oriented in approximately the same direction, with the corrugations in the odd corrugated layers 15, 17, etc., oriented at a small angle from the perpendicular in one direction and the corrugations in the even corrugated layers 16, 18, etc., oriented at a small angle from the perpendicular in the opposite direction. In FIG. 2, the adjacent pieces of 15 and 15', 15' and 16, 16 and 16', 16' and 17, etc., of foil 11, 12 are bonded at substantially all contiguous points so that each passage is isolated from every other passage.

Where the support 10 is made of inert conductive material, the electrode 20 is rechargeable. Typically the inert material consists essentially of nickel, and the active material 21 consists essentially of cadmium hydroxide or nickel hydroxide.

The corrugated foil 11 typically is about 0.3 to 1 mil thick, and the flat foil 12 about 0.2 to 1 mil thick. The corrugations typically are substantially triangular in cross section (i.e., a cross-sectional or edge view as in FIG. 3 or FIG. 4 has the shape of a triangular wave), with each corrugation about 2 to 6 mils high and 2 to 10 mils wide and with the height of each corrugation at least about one-half its width. The density of the support 10 (i.e., the degree to which it fills the space within its outer dimensions) preferably is less than about 25 percent, and the density of the electrode 20 preferably is less than about 55 percent.

The invention includes also an electrochemical cell (not shown) comprising an electrode 20 as disclosed herein and means for maintaining the electrode 20 in an upright position with the pieces of corrugated foil 11 therein positioned in substantially horizontal planes. The upright position is especially important for electrodes as in FIG. 1 comprising only corrugated foil 11, to avoid migration of active material 21 from one level of passages to a different level because of gravitational forces.

Figure 3:
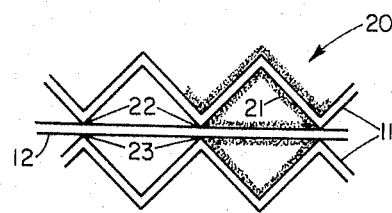
FIG. 3 is a front view of a portion of still another such electrode.

FIG. 3 is a front view of a portion of an electrode 20 similar to that in FIG. 2, except that in FIG. 3 the corrugations in each piece of corrugated foil 11 are oriented in substantially the same direction (and preferably approximately perpendicular to the sides of the electrode 20 (i.e., the front face shown in FIG. 3 and the face directly opposite thereto at the other end of the passages)). The electrochemical properties of an electrode 20 as in FIG. 3 are excellent, but such an electrode is more difficult to make than one as in FIG. 2, where optimum physical properties are required. As indicated in FIG. 3 the trough 22 of each corrugation in the upper corrugated piece of foil 11 bonded to the upper surface of the flat piece of foil 12 should be directly above the crest 23 of a corrugation in the lower corrugated piece of foil 11 bonded to the lower surface of thes ame flat piece of foil 12, to provide a structure having optimum strength and other physical properties. If the corrugations in successive layers of the corrugated foil 11 do not register in this way, the electrode 20 may be much weaker.

Figure 4:
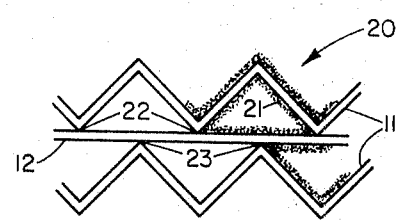
FIG. 4 is a view similar to FIG. 3 showing (for comparison) a variation thereof that should be avoided.

In FIG. 4 an extreme condition is shown wherein the troughs 22 of the upper piece of corrugated foil 11 are bonded to the upper surface of the flat piece of foil 12 along lines approximately midway between those indicated at 23 along which the crests of the corrugations in the lower piece of corrugated foil 11 are bonded to the lower surface of the flat piece of foil 12. From FIG. 4 it is apparent that such a structure is inherently weak and less resistant than the structures in FIGS. 2 and 3 to distortion by vertical compression.

As disclosed and claimed in the United States patent application of Glenn R. Schaer referred to above, a typical presently preferred method of making porous conductive supports 10 for electrodes 20 according to the present invention suitable for use in electrochemical cells comprises forming thin corrugated metal foil, stacking pieces 11 of the corrugated foil, the corrugations 13 in adjacent pieces 11 being oriented at different angles, as in FIGS. 1 and 2, bonding the adjacent pieces of foil, and cutting the bonded stack in planes substantially perpendicular to the foils. Typically a piece 12 of thin flat metal foil is placed between adjacent pieces 11 of the corrugated foil, as in FIG. 2.

Typical foils 11, 12 consist essentially of nickel, with the corrugated foil 11 about 0.3 to 1 mil thick and the flat foil 12 about 0.2 to 1 mil thick. The corrugations 13 typically are substantially triangular in cross-section (i.e., a cross-sectional or edge view has the shape of a triangular wave), with each corrugation 13 about 2 to 6 mils high and 2 to 10 mils wide and with the height of each corrugation 13 at least about one-half of its width. The density of the support 10 (i.e., the degree to which it fills the space within its outer dimension) preferably is made to be less than about 25 percent. Alternate pieces 15, 17, etc. and 16, 18, etc., of the corrugated foil 11 typically are oriented with their corrugations in approximately the same direction, and the angle between the corrugations in successive pieces 15 and 16, 16 and 17, 17 and 18, etc. of the corrugated foil 11 typically is about 5 to 40 degrees.

The pieces of foil 11, 12 typically are bonded by heating in a nonoxidizing atmosphere, which may comprise essentially hydrogen, and the adjacent pieces 15 and 16, 16 and 17, 17 and 18, etc. in FIG. 1; 15 and 15', 15' and 16, 16 and 16', 16' and 17, etc. in FIG. 2, of foil 11, 12 preferably are bonded at substantially all contiguous points. Thus maximum strength is provided, and in the support 10 in FIG. 2 each passage formed by a corrugation 13 and the flat foil 12 bonded thereto is separate from every other such passage.

The planes in which the stack is cut (i.e., the planes of the edges at the lower left and upper right in each figure) typically are substantially parallel, about 25 to 50 mils apart, and approximately perpendicular to the direction bisecting the angle between the corrugations 13 in successive pieces of the corrugated foil. Thus if the angle between corrugations is about 15 degrees, each corrugation 13 in the pieces 15, 17, etc. is about 7.5 degrees from the perpendicular to the sides of the support 10 in one direction and each corrugation 13 in the pieces 16, 18, etc. is about 7.5 degrees from the perpendicular in the opposite direction. Before the cutting, the bonded structure typically is filled with an epoxy which is removed after the cutting by dissolving in hot chromic acid, typically about 250 to 600 grams per liter of chromic acid at about 140 to 200° F.

The corrugated foil 11 typically is electroformed on a conductive corrugated surface wherein the corrugations are substantially triangular in cross-section and are polished to a highly smooth surface finish from which the electroformed foil is readily removable. Typically it is electroformed on a cylindrical mandrel comprising a continuous helical threaded portion as in a bolt, but with the thread substantially triangular in cross-section and polished to a highly smooth surface finish from which the electroformed foil is readily removable. The forming surface typically is subjected to a fine polishing wherein a slurry of fine abrasive particles in water is spread over the surface by a brush of fine wires, the ends of which typically are provided with sharp points by chemical etching, and then plated with bright chromium.

Electrodes 20 as in FIG. 3 can be made similarly, except that the corrugated pieces 11 are positioned with their corrugations all oriented in the same direction and with adjacent troughs 22 and crests 23 registering as shown in FIG. 3.

EXAMPLES

Porous-plaque support structures were prepared as described above (and as described in more detail in the examples of the Schaer patent application). Then they were coined (compressed on the edges) to leave a porous area of 2.54 x 2.54 cm. (1 x 1 inch). A 0.0254-cm. (10 mil) thick nickel-foil tab was spot welded to one edge of the electrode.

The technique chosen was standard vacuum impregnation with aqueous cadmium nitrate solution followed by cathodization in hot KOH. This method is used throughout the batter industry to make cadmium electrodes for sintered-plate nickel-cadmium batteries. Minor variations of a proprietary nature may exist in the process from one manufacturer to another, but the basic process seems to be similar in all known cases. By using this standard vacuum-impregnation process, the electrodes having the new plaque structures could be compared readily with commercial electrodes since the method of impregnation was the same for both types of electrodes.

The basic vacuum-impregnation process has been described many times in the literature (e.g., Fleischer, A., "Sintered Plates for Nickel-Cadmium Batteries," Trans. Electrochem. Soc., 94 (6), 289–299 (1948); Bailin, P., "Electroforming Automation at Columbia Records," Plating, 56 658–664, (1969); and Falk, S. U., and Salkind, A. J., Alkaline Storage Batteries, John Wiley and Sons, Inc., New York (1969), pages 131–134). The specific details of the process as used here are as follows:

(1) Soak the plaques for 5 minutes under vacuum and for an additional 5 minutes under atmospheric pressure in a cadmium nitrate solution prepared in the following manner: Dissolve 1360 g. of $Cd(NO_3)_2 \cdot 4H_2O$ in enough warm distilled water to make 1 liter of solution. Add 1 g./l. of polyethylene glycol MW 6000. After the polyethylene glycol is dissolved, vacuum filter through a fine filter paper such as Whatman No. 5 to remove any dirt from the solution. Add concentrated nitric acid to adjust the free-acid concentration to the desired value of 3–4 g./l.

(2) Cathodize the plaques containing the cadmium nitrate solution for 20 minutes in 20 weight percent KOH which has been preheated to 90–100° C. The current density is 6.4 ampere per square cm. of plaque. The plaques are placed in the electrolyte with the current flowing as described in the references cited above.

(3) Rinse the cathodized plates in distilled water and scrub gently with a nylon bristled brush to remove $Cd(OH)_2$ precipitated on the surface. Wash the plates in distilled water at 40° C. for 4 hours or until the last drop of wash water from a plate shows no KOH when tested with phenolphthalein indicator.

(4) Dry the plates at 60° C. This drying is preferably done in a vacuum oven to prevent the impregnated plates from absorbing $CO_2$.

These four steps constitute an impregnation cycle. In order to obtain the desired capacity for an electrode, it is necessary to perform between four and eight impregnation cycles.

The apparatus used to impregnate plaques with cadmium nitrate solution consisted of a bell jar placed over a Lucite tank containing the plaques to be impregnated. The bell jar is connected through Tygon tubing to a reservoir of the impregnating solution and to a vacuum pump. The pressure should be about 10 mm. Hg before impregnation is begun. The solution is transferred from the reservoir to the impregnation tank by raising and tilting the reservoir. The Lucite tank was grooved to hold the plaques in an upright position without their touching each other. Ten plaques were impregnated at one time using this equipment.

The polarization tank was made of nickel and served as the counterelectrode during cathodization. The plaques to be cathodized were individually held in nickel-plated battery clips connected to a nickel bus bar. The bus bar rests on a Lucite insulator on top of the nickel tank. Ten plaques were processed simultaneously in this tank. After the plaques impregnated with cadmium nitrate were placed in the clips and lowered into the tank, the negative terminal of a constant-current power supply was connected to the bus bar and the positive terminal was connected to the nickel tank. The power supply was turned on and 20 percent KOH that had been previously heated to 90–100° C. in a stainless steel breaker was poured into the tank to complete the circuit. Electrolysis was performed for 20 minutes at a current density of 0.4 amp per square cm. of electrode.

After the electrodes were removed from the cathodization tank, rinsed with distilled water, and scrubbed with a nylon brush to remove precipitated $Cd(OH)_2$ from their surfaces, they were washed for 4 hours in distilled water at about 40° C. The distilled water had a specific resistance over 500,000 ohm-cm. The wash tank used in this work was a covered polyethylene pan. A recirculating pump was connected through Tygon tubing to inlet and outlet holes cut in the pan. The wash water was continuously circulated about the electrodes, which were held in a stainless steel wire basket. The wash water was replaced about every 30 minutes during the 4-hour washing time.

After washing, the electrodes were dried overnight in a vacuum oven at 60° C. Twenty honeycomb plaques of each set with 0.01, 0.0076, 0.0061, and 0.0049-cm. pore diameters, 10 honeycomb plaques with 0.015-cm. pore diameters, and 20 sintered-powder plaques were impregnated with cadmium hydroxide using the above standard vacuum-impregnation procedure. As part of the experimental plan, all plaques received as many impregnation cycles as were required to fill approximately 40 percent of the pore volume with cadmium hydroxide. In order to determine when the plaques were filled with the desired amount of cadmium hydroxide, the partially impregnated plaques were dried and weighed after each impregnation cycle.

Subsequent chemical analysis of the impregnated electrodes showed that the starting assumption that all the weight gain during impregnation was due to cadmium hydroxide was invalid. The honeycomb electrodes were found to contain a smaller ratio of cadmium hydroxide to metallic cadmium than did the sintered-powder electrodes. Total cadmium was determined by titrating with EDTA aliquot solutions of the electrodes dissolved in nitric acid using the procedure given on pages 7 and 8 of the report by A. H. Reed, P. W. Cover, and J. McCallum, "Failure Mechanisms and Analyses of Sealed Batteries," Technical Report AFAPL-TR-69-74 (September 1969), Wright-Patterson Air Force Base Contract No. AF 33(615)-3701, page 23. Then, the amount of metallic cadmium in the impregnated material was calculated from the difference between the weight gain after the final impregnation cycle and the chemical analysis data for total cadmium.

After the electrodes were impregnated to what was estimated to be about 40 percent of the pore volume with $Cd(OH)_2$, they were given a series of formation cycles which serve two functions: (1) impurities such as nitrate and carbonate and loosely adhering particles are removed from the electrodes and (2) the active material is "exercised" by the series of charge-discharge cycles which probably increases the lattice defects and the surface area of the active material.

To implement the desired formation the cadmium electrodes were arranged alternately between nickel hydroxide positive electrodes with two layers of perforated polypropylene separators between adjacent electrodes. The electrodes were connected so that all cadmium electrodes were in parallel, as were all nickel electrodes. Each formation cell contained four cadmium electrodes and five nickel electrodes. The electrolyte in the formation cells was 30 percent KOH. The electrodes were soaked in the electrolyte for 16 to 24 hours before cycling was begun. The series of formation cycles was performed as follows:

Cycle 1.—Charge for 16 hours (overnight) at the C/7 rate based on the theoretical capacity of the negative electrodes. This theoretical capacity was calculated from the total weight gain during impregnation assuming it to be in the form of $Cd(OH)_2$. Discharge at the C/7 rate to 1 volt per cell.

Cycle 2.—Same as Cycle 1.

Cycle 3.—Charge at C/5 for 7 hours. Discharge at C/5 until both sets of electrodes are completely discharged.

Following the third formation cycle, the electrodes were rinsed in distilled water, wet brushed to remove any loose particles, and washed for 4 hours in distilled water at 40° C. as was done during impregnation. They were then stacked between layers of filter paper and dried at 60° C. The stacks of electrodes were clamped between pieces of Lucite to prevent possible warping during drying.

Before any cycling experiments were conducted, capacities of single cadmium electrodes were measured by immersing one electrode in a beaker of 30 percent potassium hydroxide solution. Each electrode was cycled using two nickel-foil counterelectrodes. The approximate capacities were determined so that charge and discharge currents based on C rates could be selected. The C rate is the current which will deliver the specified ampere-hour capacity in 1 hour. The capacity of the sintered-powder electrodes estimated from formation cycling data was 240 ma.-hr. When a single sintered-powder electrode was discharged at 240 ma. it ran for 70 minutes before the knee of its discharge curve with respect to Hg/HgO reference electrode was reached. Therefore, it had a capacity of 280 ma.-hr. and the C rate used for the sintered-powder electrodes was 280 ma. When the 0.0061 and 0.0076-cm. honeycomb electrodes were discharged at 240 ma., they ran for 30 minutes. Thus, their C rate was 120 ma. This same rate was also used for the other three pore sizes of honeycomb electrodes with the expectation that this would allow direct comparison of pore sizes.

A group of honeycomb electrodes of each size and a group of sintered-powder electrodes were cycled according to the following cycle regimes:

| Cycle regime | Charge rate | Discharge rate |
| --- | --- | --- |
| 1 | C/2 | C |
| 2 | C/2 | C/2 |
| 3 | C | C |
| 4 | 2C | 2C |
| 5 | C/4 | C/4 |
| 6 | 4C | 4C |

Each group received a minimum of five charge-discharge cycles at each regime. Each electrode was operated in a separate cell. The cells consisted of one negative and two positive electrodes. One layer of Pellon 2505 was used as the separator. Two Plexiglas end plates held each cell together with stainless steel bolts. Cells were placed in an open beaker filled with 30 percent potassium hydroxide. The potential of the cadmium electrodes during charge and discharge was measured with respect to a Hg/HgO reference in the same solution.

The sintered-powder electrodes showed a large amount of cadmium migration compared with the honeycomb electrodes. Enough cadmium evidently migrated into the separator to short the cells. The honeycomb electrodes did not show any significant loss of cadmium into the separator. The honeycomb structures maintained their capacity throughout the cycling regimes much better than did the sintered-powder electrodes. During each of the minimum of five charge-discharge cycles at each regime, the honeycomb electrodes showed a trend of increasing capacity from cycle to cycle. This increasing capacity is a reasonable observation, because the electrodes contained an excess of cadmium metal. During each discharge some of the metal is oxidized and converted to active cadmium hydroxide.

Most of the honeycomb electrodes exhibited a decrease both in hydrogen-free charge and in discharge capacity as charge and discharge currents were increased. It is well known that battery capacities decrease with increasing currents and that this behavior can be explained as caused by increased polarization at higher current densities. However, some of the discharge capacities are more nearly equal to the charge capacities for the same honeycomb structures than can be obtained from the sintered-powder electrodes. This implies that the honeycomb structures are capable of higher rate discharges at greater efficiency than the presently used sintered-powder electrodes.

A comparison of the 4C charge-and-discharge characteristics for a sintered-powder electrode and a 0.0107-cm.-pore-diameter honeycomb electrode show that the potentials measured with respect to a Hg/HgO reference electrode are about 10 to 15 mv. lower on charge and 20 to 30 mv. higher on discharge for the honeycomb electrode than for the sintered-powder electrode. Thus, electrodes made from the honeycomb plaque structure appear to have less polarization loss at high-rate operation, which allows charging and discharging at rates two-to-five times greater than those for sintered-powder electrodes.

Further details of the above and other related examples are contained in the Final Progress Report on Development of Improved Plaque Material for Aerospace Nickel-Cadmium Cells, Contract No. NAS 5–21105, to Goddard Space Flight Center, by G. R. Schaer, F. Goebel, A. H. Reed, and J. McCallum, Battelle Memorial Institute-Columbus Laboratories, Mar. 24, 1971.

While the forms of the invention herein disclosed constitute presently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

I claim:

1. An electrode suitable for use in an electrochemical cell, comprising a porous conductive support comprising a bonded stack of pieces of thin corrugated metal foil wherein the corrugations are oriented approximately perpendicular to the sides of the electrode and form an array of passages through the electrode, and active material substantially uniformly distributed within the passages.

2. An electrode as in claim 1, wherein the support comprises a piece of thin flat metal foil between adjacent pieces of the corrugated foil.

3. An electrode as in claim 2, wherein each flat metal foil forms a barrier between the passages formed on each side of it.

4. An electrode as in claim 1, wherein the corrugations in alternate corrugated layers are oriented in approximately the same direction.

5. An electrode as in claim 1, wherein the corrugations in the odd corrugated layers are oriented at a small angle from the perpendicular in one direction and the corrugations in the even corrugated layers are oriented at a small angle from the perpendicular in the opposite direction.

6. An electrode as in claim 2, wherein the adjacent pieces of foil are bonded at substantially all contiguous points so that each passage is isolated from every other passage.

7. An electrode as in claim 1, wherein the support is made of inert conductive material and the electrode is rechargeable.

8. An electrode as in claim 7, wherein the inert material consists essentially of nickel, and the active material consists essentially of cadmium hydroxide or nickel hydroxide.

9. An electrode as in claim 2, wherein the corrugated foil is about 0.3 to 1 mil thick.

10. An electrode as in claim 9, wherein the flat foil is about 0.2 to 1 mil thick.

11. An electrode as in claim 1, wherein the corrugations are substantially triangular in cross section.

12. An electrode as in claim 1, wherein each corrugation is about 2 to 6 mils high and 2 to 10 mils wide.

13. An electrode as in claim 12, wherein the height of each corrugation is at least about one-half its width.

14. An electrode as in claim 12, wherein the density of the support is less than about 25 percent.

15. An electrode as in claim 12, wherein the density of the electrode is less than about 55 percent.

16. An electrochemical cell comprising an electrode as in claim 1, and means for maintaining the electrode in an upright position with the pieces of corrugated foil therein positioned in substantially horizontal planes.

References Cited

UNITED STATES PATENTS

| | | | |
|---|---|---|---|
| 2,275,194 | 3/1942 | Sizelove | 136—36 X |
| 2,333,343 | 11/1943 | Sendzimir | 29—470.9 |
| 3,068,565 | 12/1962 | King et al. | 29—472.3 |
| 3,206,332 | 9/1965 | Juda | 136—120 FC |
| 3,206,334 | 9/1965 | Ehrenfeld | 136—120 FC |

ANTHONY SKAPARS, Primary Examiner

U.S. Cl. X.R.

136—45